US011951642B2

(12) United States Patent
Forman et al.

(10) Patent No.: US 11,951,642 B2
(45) **Date of Patent: *Apr. 9, 2024**

(54) WEB PROCESSING MACHINE

(71) Applicant: Sealstrip Corporation, Gilbertsville, PA (US)

(72) Inventors: Jo Anne Forman, Pennsburg, PA (US); Robert E. Lincoln, Blandon, PA (US)

(73) Assignee: Sealstrip Corporation, Gilbertsville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,103

(22) Filed: Oct. 19, 2022

(65) Prior Publication Data

US 2023/0048955 A1 Feb. 16, 2023

Related U.S. Application Data

(62) Division of application No. 16/950,626, filed on Nov. 17, 2020, now Pat. No. 11,511,454.

(51) Int. Cl.
*B26F 1/38* (2006.01)
*B26D 7/20* (2006.01)
*B26F 1/42* (2006.01)
*B26F 1/44* (2006.01)

(52) U.S. Cl.
CPC .............. *B26F 1/384* (2013.01); *B26D 7/204* (2013.01); *B26F 1/42* (2013.01); *B26F 1/44* (2013.01)

(58) Field of Classification Search
CPC ...... B26F 1/38; B26F 1/42; B26F 1/44; B26F 1/384; B26F 7/204; B26F 7/20
USPC .............................................................. 83/346
See application file for complete search history.

(56) References Cited

U.S. PATENT DOCUMENTS 5,001,950 A * 3/1991 Fokos .................... B26D 7/265 83/37
5,775,193 A 7/1998 Pratt
6,205,898 B1 * 3/2001 Surina .................... B23D 25/02 83/287

(Continued)

FOREIGN PATENT DOCUMENTS

WO WO-2019173320 A1 * 9/2019 ............. B26D 1/405

OTHER PUBLICATIONS

International Searching Authority, International Search Report and Written Opinion of PCT/US21/59515, dated Feb. 4, 2022, 8 pages.

*Primary Examiner* — Nhat Chieu Q Do
(74) *Attorney, Agent, or Firm* — Ryder, Mazzeo & Konieczny LLC; Greg Gore; Douglas J. Ryder

(57) ABSTRACT

A packaging line station having a frame, a die assembly, a drive motor, and an anvil roller. The frame has a base with two vertical stanchions extending upwardly from sides thereof and a top cross-member affixed across the stanchions. The die assembly includes a yoke affixed to the cross-member, a die wheel rotatably affixed to side arms of the yoke, a drive shaft affixed to the die wheel and a cutting die affixed to the die wheel. The drive motor is connected to the drive shaft. The drive shaft and the anvil roller extend between the stanchions. The cutting die and the anvil roller and spaced apart by a nip for receiving a traveling web. As the web passes through the nip the web is cut by blades of the rotating die to form a slit. An adhesive resealable tape or label is then applied over the slit.

29 Claims, 7 Drawing Sheets

(56) References Cited

U.S. PATENT DOCUMENTS

| | | | |
|---|---|---|---|
| 8,863,627 | B2 | 10/2014 | Kandemir |
| 9,522,478 | B2 * | 12/2016 | Horii ........................ B26F 1/384 |
| 2004/0149105 | A1 | 8/2004 | Michalski |
| 2006/0162172 | A1 | 7/2006 | Lindsey, Jr. |
| 2007/0101844 | A1 | 5/2007 | Spilker |
| 2008/0066632 | A1 | 3/2008 | Raueiser |
| 2009/0320663 | A1 * | 12/2009 | Yamamoto ........ A61F 13/15723 83/100 |
| 2012/0012016 | A1 | 1/2012 | Moeller |
| 2018/0036782 | A1 * | 2/2018 | Ehrmann ............... B21D 28/28 |
| 2018/0117786 | A1 * | 5/2018 | Schuster .................. B26D 5/02 |
| 2018/0311852 | A1 | 11/2018 | Yoshihara |
| 2021/0114246 | A1 | 4/2021 | Jensen |

* cited by examiner

WEB PROCESSING MACHINE

PRIORITY

This application is a divisional of and claims benefit under 35 USC § 120 of U.S. patent application Ser. No. 16/950,626 filed on Nov. 17, 2020. U.S. patent application Ser. No. 16/950,626 is incorporated herein by reference in its entirety.

FIELD

This invention relates to the die-cutting of flexible webs. More specifically it relates to the intermittent cutting of a flexible web as it travels along a packaging production line.

BACKGROUND

Resealable packages have been made by covering a slit in the packaging film with a pressure sensitive tape or label. The package may be fully sealed but depending on the film structure, the package would not be hermetic because of the continuous slit through the end seal. To control and contain the die cut to a limited space between the end seals of a package to maintain the hermeticity of a package made with a barrier film an intermittent cutting system can be used.

Accurate control of the intermittent operation of the die cutting is critical to its performance on a packaging line where product is being packaged. Packaging lines ramp up and down in speed, sometimes coming to a complete stop to wait for product to be packaged. This is unlike continuous rotary systems such as printing presses and converting machines, which because of high rotational mass, require careful and very slow ramping up and down, or stopping of the machine.

Traditionally die stations using rotary dies to cut flexible webs are wider than the width of the flexible web. Because they rely on bearers located on both ends of the rotary die, they are equal or a very slightly higher than the length of the die blade. Bearers maintain the cutting gap to guarantee a precise space between the anvil and the die blade pair to prevent the rotary die from crushing against the anvil when cutting through the flexible web.

In that case, the width of the web dictates the width of the die and anvil pair. Wider webs result in wider die and anvil pairs and wider dies and anvils must be of a large diameter to prevent deflection under cutting loads. Thus, the rotational mass and weight of the die and anvil pair are increased dramatically. As production speed increases poor acceleration and deceleration control result due to the very high rotational mass of the components. The precise control of acceleration and deceleration of the die is necessary for intermittent and accurate registration when die cutting the web.

There is therefore a need in the art of packaging die cutting for making accurate cuts in a traveling web. There is a further need for an intermittent die cutting device with low rotational mass that permits high-speed and accurate control of the cut slit placement on the packaging web material.

SUMMARY

The present invention creates a resealable package opening to access the product within which employs a resealable tape or label applied over a cut slit in the packaging film. This type of resealable package is made on the packaging line where a series of slit cuts are made to a moving web and a resealable tape is applied. Further benefits of making the taped cuts on the packaging line are reduced costs of pre-applying, lower shipping costs and less inventory storage space.

To make an accurately placed die cut in a traveling web, the present device has been devised to significantly reduce the mass of the die cutting components for accurate cut placement. The result is a series of individual cuts made to the moving web at precise locations. The present device employs an anvil of a small diameter that extends the full width of the web material that provides the benefit of low rotational mass. This device further utilizes a narrow rotary die wheel which is possible because there are no anvil bearers on the ends of the die. Instead of bearers on the ends of the die, the critical nip gap between the anvil and the die is maintained by the supporting frame structure of the die station which holds the die assembly. The reacting load on the anvil is therefore the only force of making the cut. The cutting force on the anvil, which because of its small diameter may tend to flex, is counteracted by a set of support bearings below the anvil that prevent unwanted flexing. The result is a scoring of the packaging web along a slit pattern which breaks open upon the first opening of the package. In one embodiment intermittent action of the die wheel is employed. In the present device this is provided by a programmable motor which stops and starts the rotation of the die wheel during each 360-degree rotation of the wheel which is coordinated with the position of the web.

A station for a packaging line having a frame, a die assembly, a drive motor, and an anvil roller as the main components. The frame has a base with two vertical stanchions extending upwardly from either side of the base. A top cross-member is affixed across the tops of the stanchions. The die assembly includes a yoke affixed to the cross-member, a die wheel rotatably affixed to side arms of the yoke, a drive shaft affixed to the die wheel and a cutting die affixed to the circumference of the die wheel. The drive motor is mounted to the frame and is connected to the drive shaft. The drive shaft and an anvil roller extend between the stanchions and is affixed to them at opposite ends. By these mechanical relations, the cutting die is rotatable in non-contacting close proximity to the anvil roller and spaced apart by a nip having a gap for receiving a traveling web. As the web passes through the nip the web material is cut into by blades of the rotating die which necessarily span an arc of less than 360 degrees. An adhesive resealable tape or label is then applied over the cut slit.

The die station may further include anvil support bearings on the underside of the anvil roller opposite the nip which ride on a laterally translatable carriage mounted to the frame. An upper carriage carries the die assembly and is likewise laterally translatable. Both carriages may be linked together so that they always remain in alignment as they are moved together laterally. The die assembly includes adjustment device between the cross-member and the yoke for obtaining the desired nip gap between the die wheel cutting blade and the anvil roller. The die wheel is preferably magnetic, and the cutting die is affixed to the wheel by magnetism. For easy exchange of different die assemblies, a subassembly holding the die assembly can be removed from the frame without disturbing many of the other components.

In order to accurately place the cut slit pattern on the packaging web an intermittent drive system can be employed which is controlled by a programmable drive motor. The rotation of the die wheel and hence the cutting of the web is triggered by a sensor which reads eye-marks on the web upstream of the die wheel. The speed of the die wheel is matched to the web speed by a web speed sensor. High-speed operation is achieved because the operative components are constructed to have a low rotational mass. For example, the die assembly does not use bearers which then allows the width of the die to be only a little more than the width of the slit pattern which provides a very light-weight and narrow die. To further reduce the rotational mass of the reciprocating components, the anvil roller is constructed of small diameter hollow tubing backed by support bearings to prevent flexing of the lightweight anvil roller.

The specific examples provided in this summary are illustrative only of some features of the invention. From the following drawings and a detailed description of embodiments of the invention, those of skill in the art will appreciate that the objects of the invention to devise an accurate die cutting station for a packaging line have been achieved.

DETAILED DESCRIPTION

Figure 1:
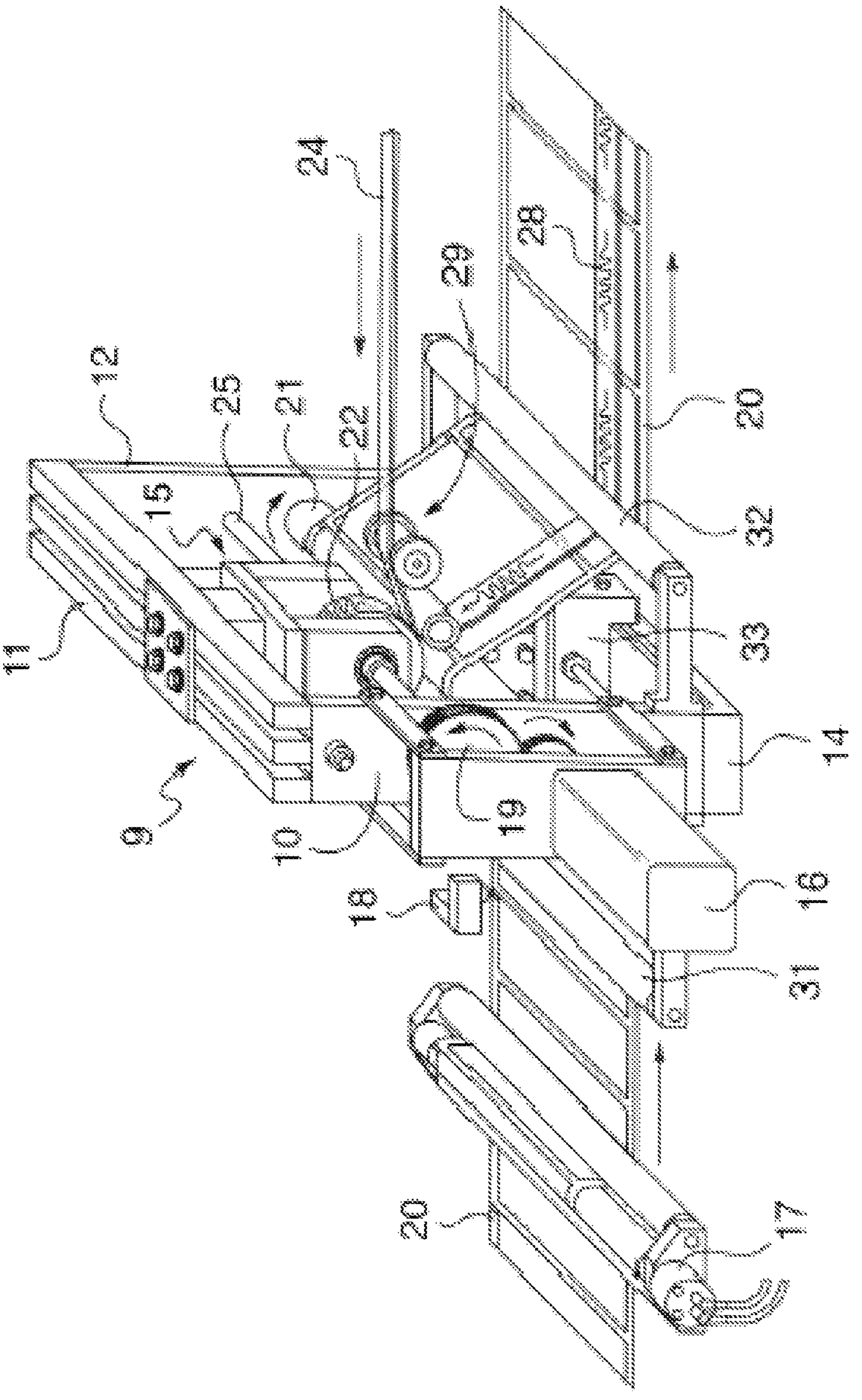
FIG. 1 is a perspective view of an example die station in a packaging line, according to one embodiment.

FIG. 1 illustrates a perspective view of an example packaging line die station 9. A packaging line web 20 follows a generally horizontal path through the die station 9 (from left to right as indicated by the arrows). For the purposes of this description the web path direction will be referred to as "longitudinal" and the web as lying in a horizontal plane. The term "lateral" will mean the direction crossways to the web perpendicular to the longitudinal direction. The term "vertical" will mean the direction defined by a plane perpendicular to the horizontal plane. The same structures are like numbered throughout the various figures of drawing.

Figure 2:
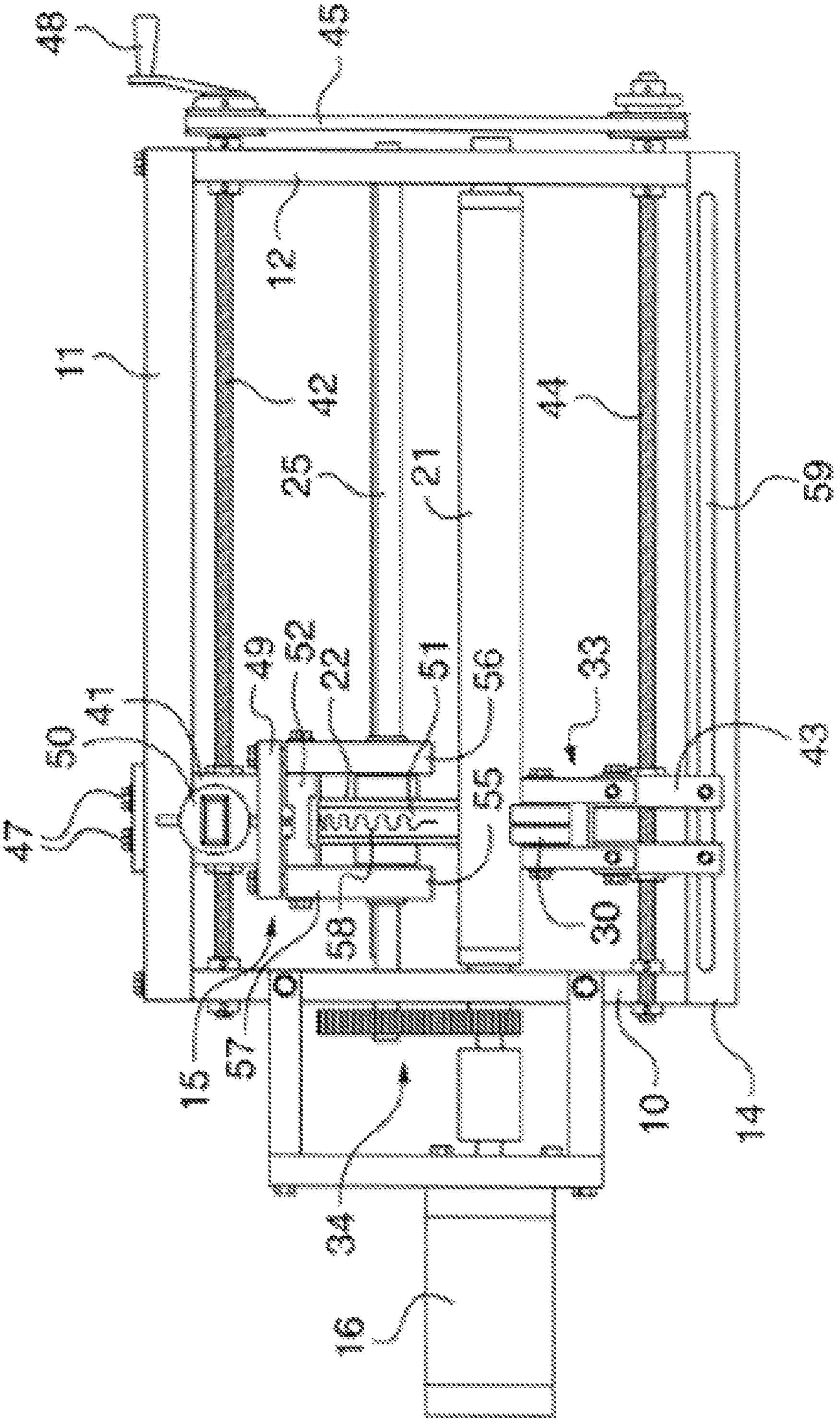
FIG. 2 is a rear view of an example die station, according to one embodiment.
Figure 3:
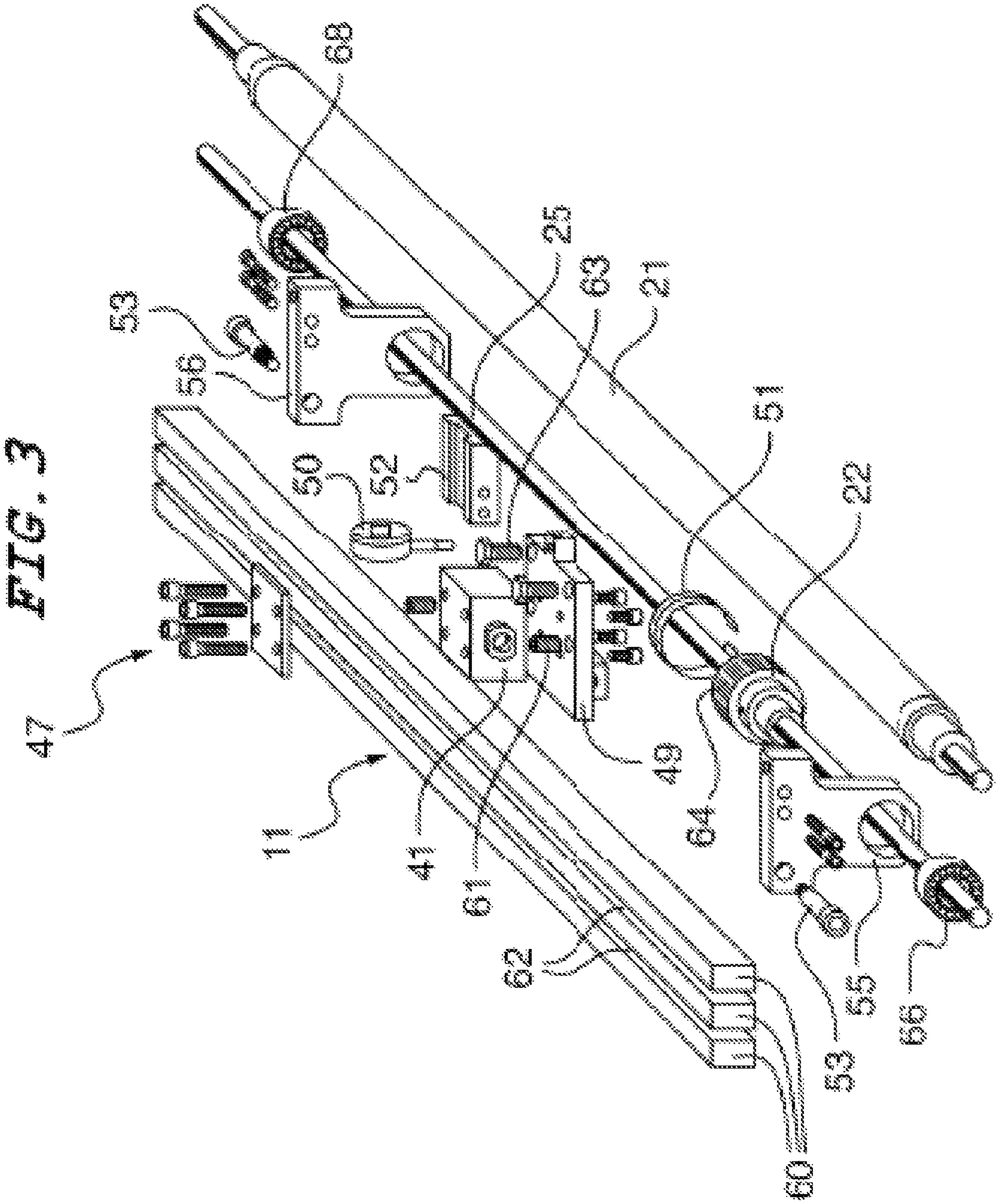
FIG. 3 is an exploded view of a portion of an example die station, according to one embodiment.
Figure 4:
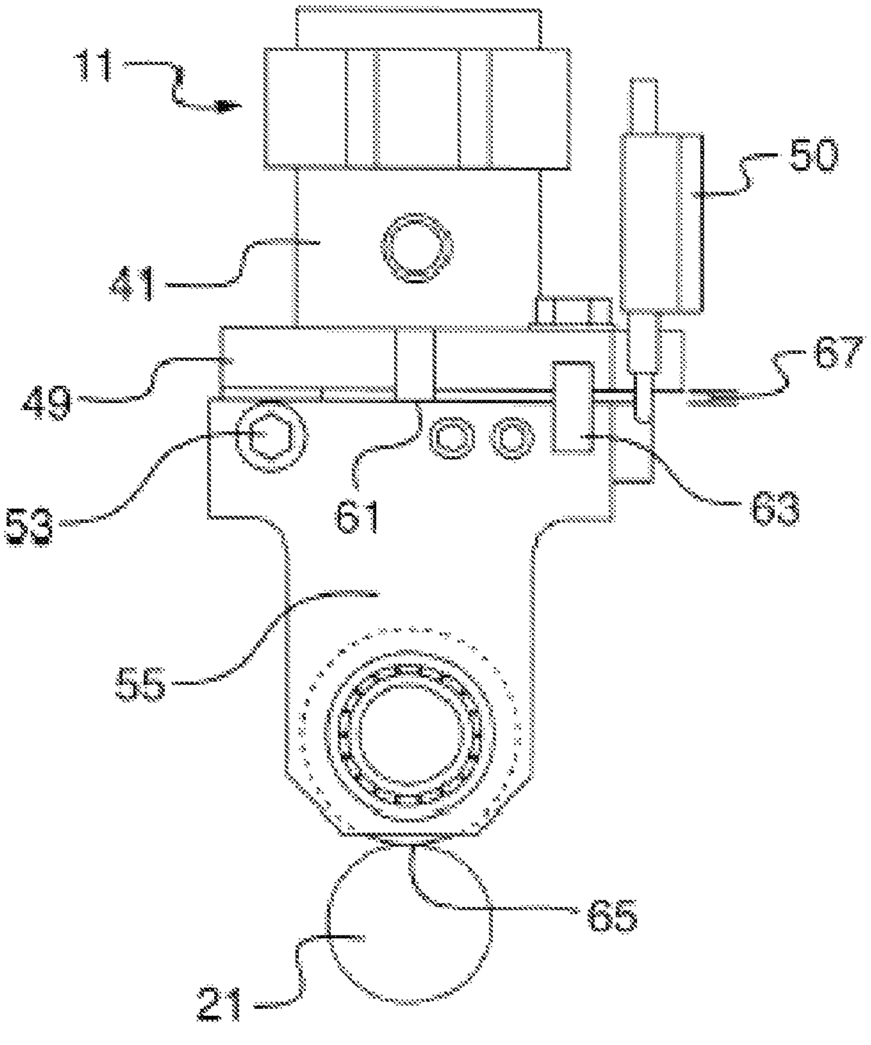
FIG. 4 is a side cross sectional view of an example die wheel assembly, according to one embodiment.

The orientation of package panels on web 20 are longitudinally side-by-side. As illustrated, four sides of each panel are graphically outlined. A width of each panel defines a repeat length of the web. When completed, the individual panels will form the front panel of each package. A series of individual cuts 28 will be placed on a center of each panel. As the packaging line moves through the die station 9 it passes underneath a die assembly 15. The die assembly 15 includes a die wheel 22 having a die strip with blades which cut into the web forming the slit pattern 28 in each web panel (greater detail of the die assembly 15 is shown in FIGS. 2 through 4). The cutting operation occurs at a nip between the die wheel 22 and an anvil roller 21 which supports the web 20 on an opposite side of the die wheel 22. During the cutting phase of die wheel operation, the circumferential speed of the die wheel 22 is regulated to always equal the circumferential speed of the anvil roller 21 and the linear speed of the web 20. The web material may be single-ply or multi-ply and may be composed of a polycarbonate or other flexible packaging film.

The basic elements of the die station 9 include a frame (base 14, two upward extending vertical stanchions 10, 12 affixed at opposite sides of the base 14, and a top cross-member 11), the die assembly 15 rigidly suspended from the cross-member 11, and the anvil roller 21 which supports the web 20. The anvil roller 21 is positioned vertically opposite the die wheel 22 forming a nip between the die wheel cutting blades and the anvil roller 21 through which the web 20 passes. As further described in FIG. 7, the operation of the die wheel 22 is controlled in part by a web speed sensor 17 and a web position sensor 18 which reads an eye mark on the web. A sensor (not shown) on a die wheel drive shaft 25 reads the rotational position of the die wheel 22. The sensor(s) is connected to a programmable controller (not shown) which regulates motion of the die wheel 22 provided by a drive motor 16. Gearing including a gear wheel 19 maintains the relative speed coordination between the die wheel 22 and the anvil roller 21. Rollers 31, 32 together with the anvil roller 21 guide the web 20 through the die station 9. According to one embodiment, the anvil roller 21 is rotatably supported by, and extends the full width of, the die station 9 between the stanchions 10, 12.

Subsequent to the die cutting, an adhesive resealable continuous tape 24 is applied to the package web 20 which covers over each slit 28. To this end, a tape applicator assembly 29 is affixed to the frame which pulls the tape 24 from a supply reel (not shown). The adhesion of the leading portion of the tape 24 to the web 20 pulls the tape 24 from the supply while a roller applies the tape to the web 20. In similar fashion a label can be applied over each slit 28. In use, when the package is completed and filled, the user pulls down the tape or label over the slit 28 to form an opening in the package through which its contents can be removed. The adhesion of the tape 24 breaks apart the web material as the slit 28 separates when the package is first opened. Preferably, the slit pattern 28 is not cut all the way through the web 20 but leaves the web scored and weakened so that it will remain hermetically sealed until it is torn apart during its first opening. After that, the tape 24 or label can reseal the opening.

FIG. 2 illustrates an exit side view of an example die station 9. The frame of the die station 9 comprises the base 14, the stanchions 10, 12 and the cross-member 11. A drive motor 16 rotates the anvil roller 21 and the die wheel 22, synchronized by transmission gearing 34 which drives the die wheel drive shaft 25. While a single drive motor 16 is illustrated it is not intended to be limited thereby. For example, separate drive motors may be employed so that the anvil roller 21 can be driven independently at speed of the web 20 rather than speed of the die wheel 22. The drive shaft 25 is affixed to the die wheel 22 which is part of the die assembly 15 that is also affixed to cross-member 11. An anvil support assembly 33 is positioned opposite the die wheel 22 on a lower carriage 43 and has bearings 30 which ride against the anvil roller 21 to prevent deflection during cutting of the web 20. The anvil support assembly 33 is also secured by a guide 59 on the base 14.

The die assembly 15 can be moved laterally on an upper carriage 41 by turning a first threaded rod 42. The anvil support assembly 33 is likewise laterally translatable on a second threaded rod 44 of equal pitch which passes through the lower carriage 43. A belt system 45 connects sprockets at the ends of the first and second threaded rods 42, 44. The belt system 45 links the rotation of the threaded rods 42, 44 so that after loosening die station retention bolts 47 and turning a crank 48, the die assembly 15 and the anvil support assembly 33 will maintain their alignment as they are moved laterally in unison.

The die assembly 15 comprises a yoke consisting of side arms 55, 56 that are connected above the die wheel 22 by a top plate 52. An adjustment block 49 is affixed to the tops of the yoke side arms 55, 56 by a shoulder bolt and adjustment bolts and set screws. The adjustment block 49 can control the distance between the cross-member 11 and the yoke side arms 55, 56 which in-turn determines the nip gap distance between the die 51 and the anvil roller 21. This gap can be accurately adjusted using a dial indicator 50 which thereby measures the relative changes in the nip gap. The secondary suspension of the die assembly 15 from the drive shaft 25 permits a tensioning of the components between the cross-member 11 and the drive shaft 25. The nip gap can be adjusted for example plus or minus 0.0025 inches by a slight flexing of the drive shaft 25. Since the force on the die wheel 22 fluctuates, increasing during each cutting period, the rigid affixation of the die assembly 15 to the frame cross-member 11 is essential to maintain a constant nip gap.

FIG. 3 illustrates an exploded view of a portion of an example die station 9. As illustrated, the cross-member 11 is comprised of lateral rails 60 separated by lateral slots 62 through which the retention bolts 47 pass to permit the die station to slide laterally from one fixed position to another. A die 51 has cutting blades (e.g., slit pattern) 58 formed therein which cut into, although not all the way through, the web 20 as it passes through a cutting nip gap. The adjustment block 49 is located between the upper carriage 41 and the die wheel yoke, being affixed thereto in part by shoulder bolts 53. The bolts 63 and set screws 61 which pass through the adjustment block 49 can be turned to act on the yoke side arms 55, 56 more or less to change the distance between the yoke and an upper carriage 41. The upper carriage 41 is affixed to the cross-member 11 and rigidly held at selected positions by bolts 47 which extend through the lateral slots 62 between rails 60. While separate rails 60 are illustrated it will be understood that a unitary cross-member with lateral slots could be substituted. The die wheel drive shaft 25 rides on yoke bearings 66, 68 and extends farther outwardly on bearings on the stanchions at either end.

The die wheel 22 has magnets 64 by which the die 51 having the cutting blades 58 with the desired slit pattern is magnetically affixed to the die wheel 22. By this construction, the cutting blades 58 of the die 51 is held in very close proximity to the anvil roller 21 which extends the width of the die station 9. These components are selected to provide a very low rotational mass to accommodate high-speed intermittent operation. In this respect, the anvil roller 21 may be a hollow thin-walled tube having a diameter smaller than the die wheel 22.

The die 51 is affixed to a circular segment of a circumference of the die wheel 22 which is greater than the remaining portion of the wheel 22 which is of reduced diameter. The die wheel 22 is illustrated as a 360-degree full-circle wheel but is not limited thereto. Rather, partly circular wheels can also be employed so long as the cutting blades 58 span a circular portion which provides the effective cutting nip. In all cases the cutting blades 58 span an arc of less than 360 angular degrees. Other die wheel configurations may be employed such as one having two cutting dies spaced 180 degrees apart. When the portion of the wheel 22 having the reduced diameter is adjacent the anvil roller 21, the nip gap is wide enough so that the web 20 is released and can pass beneath the wheel 22 without interference from the wheel 22.

As further described below, during the period when the web 20 is released from contact with the die wheel 22, the speed of the wheel 22 can be changed while the web 20 can continue at a constant rate as it passes through the nip and slides over the anvil roller 21. Controlled speed variation of the wheel 22 during this non-cutting released position of the die wheel 22 permits accurate placement of the slit pattern on the web 20. As described in the operation chart of FIG. 7, the rotation of the die wheel 22 is intermittent. The die wheel 22 is stopped at a designated home position every 360 degrees of rotation while the web continues through the nip at that point. When multiple cutting dies are used, the home position is located in proportional angular degrees. So that for two dies on the wheel there are two home positions every 180 degrees and for three dies, three home positions every 120 degrees, etc.

FIG. 4 illustrates a cross sectional side view of an example die assembly 15. The cross-sectional view is a mirror image regardless of which side it is taken from. The adjustment plate 49 is rigidly affixed to the frame cross-member 11 by way of direct attachment to the upper carriage 41. The die wheel assembly is pivotable about shoulder bolts 53 (only one visible in FIG. 4, but one is located on each side) which pass through each of the yoke side arm 55 (only one side arm visible). The bolts 53 securely mount the die wheel assembly to the cross-member via the adjustment plate 49 and the upper carriage 41. A pair of screws 61 and a pair of bolts 63 (one of each pair on each side so only one of each pair visible), determine the plate angle gap 67 with regard to the die wheel yoke side arms and hence the nip gap separation distance 65. The bolts 63 which pass through the adjustment plate 49 are threaded into the yoke side arms 55 and can be turned to draw the yoke upward toward the front of the adjustment plate 49. In opposition to that motion, the ends of rearward set screws 61 pressing against the yoke side arms 55 can drive the yoke downward from the adjustment plate 49. The counteraction of these bolts 63 and screws 61 can hold the yoke in a position to exert forces on the die wheel assembly against the reactive resistance of the drive shaft. In this way, the die wheel and cutting blades can be moved toward or away from the anvil roller 21 to change the nip gap 65. It will be understood that the pair of screws 61 and the pair of bolts 63 must be turned in coordination with each other so that when all four are tightened a rigid affixation of the adjustment plate 49 to the side arms 55 of the die wheel yoke is achieved. The dial indicator 50 measures changes made to the nip gap 65.

Figure 5:
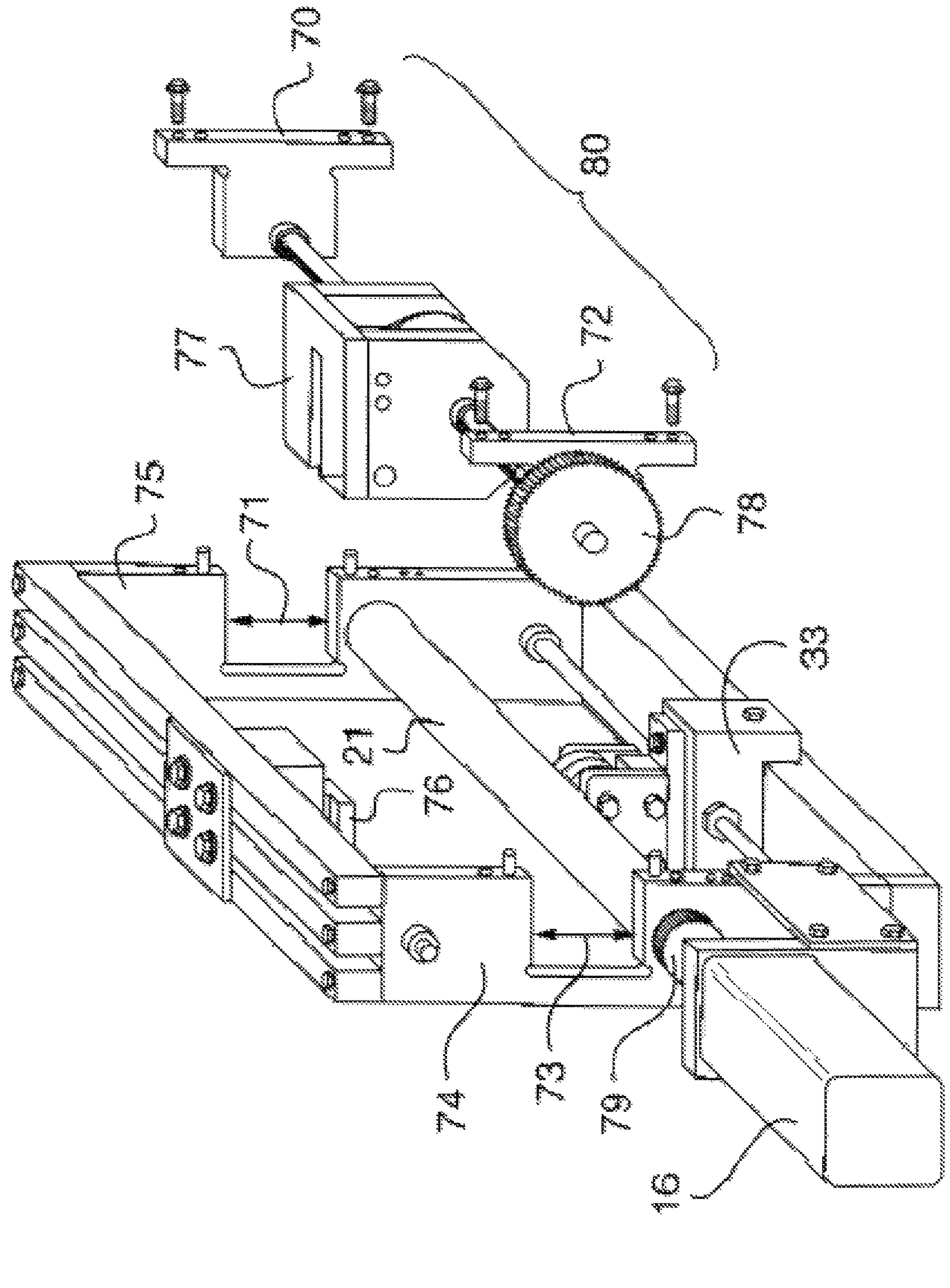
FIG. 5 is a perspective view of an example die wheel subassembly being utilized with an example die station, according to one embodiment.

FIG. 5 illustrates an example subassembly 80 to be utilized with an example die station that enables the die wheel to be changed. In this case the die wheel drive shaft is mounted at opposite ends on removable stanchion plates 70, 72. The plates 70, 72 are received in matching interfitting slots 71, 73 in stanchions 74, 75 and secured therein by bolts. A drive shaft gear 78 is dimensioned to mesh with the motor gear 79. A top plate 77 of a die yoke has a slot formed therein that receives a mating shoe 76 on the upper die assembly carriage. This subassembly 80 can easily be removed without disturbing the upper carriage, the drive motor 16, the anvil roller 21 or the support assembly 33 including the lower carriage.

Figure 6:
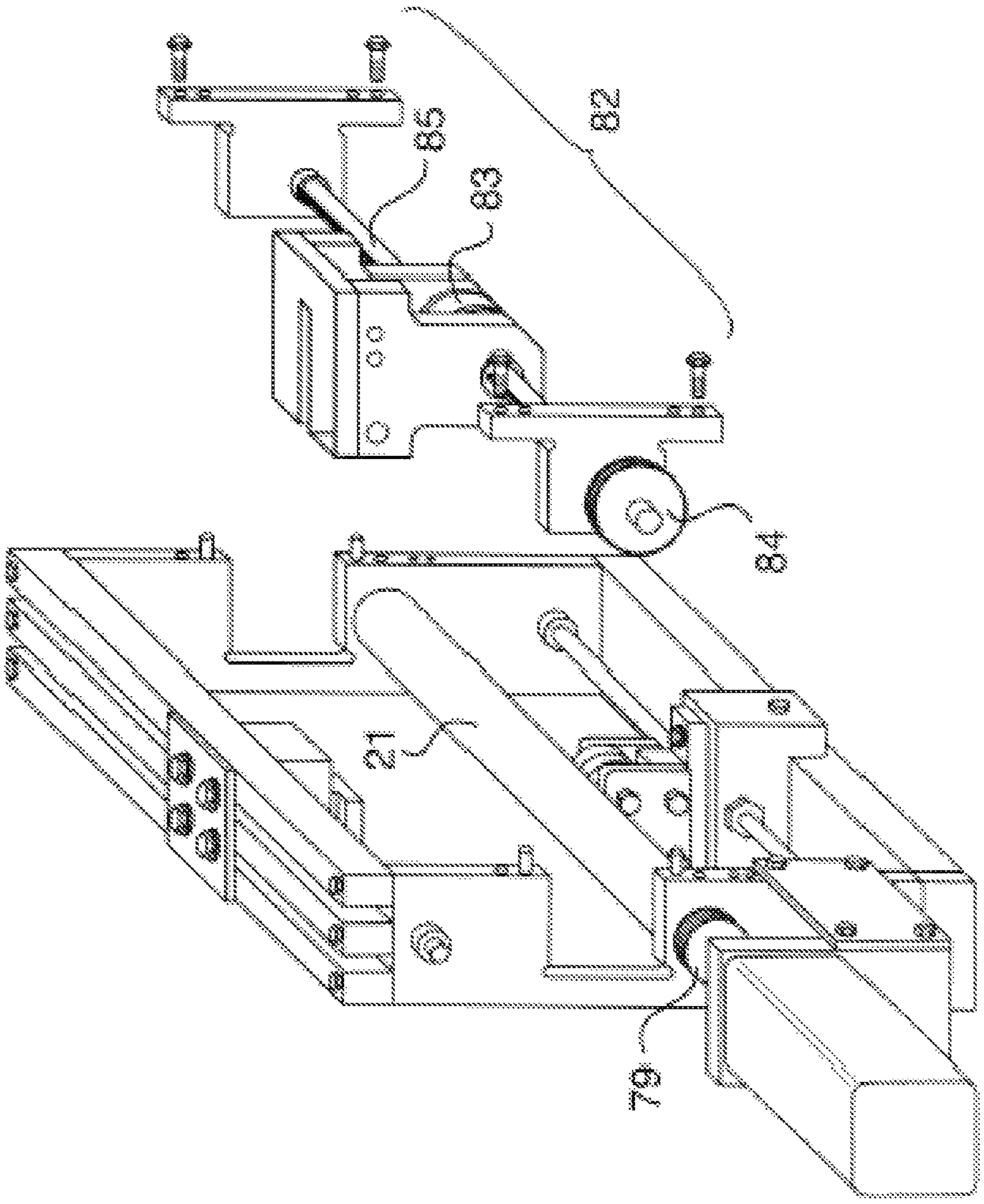
FIG. 6 is a perspective view of an example die wheel subassembly being utilized with an example die station, according to one embodiment.

FIG. 6 illustrates a subassembly 82 having a die wheel 83 of a smaller diameter than that illustrated in FIG. 5 (otherwise the rest of the die station is the same as shown in FIG. 5). The stanchion plates relocate the drive shaft 85 closer to the anvil roller 21 while a new drive gear of smaller diameter 84 meshes with the existing motor gear 79 to maintain the required rotation speed of the die wheel with respect to the anvil roller. This is possible because the die wheel and the anvil roller are of the same diameters as their respective drive gears.

For the proper operation of the die cutting station it is essential that the cutting operation occur accurately at the speed of the packaging line. The slit in each panel must be registered at a precise longitudinal location on each panel. In most cases this requires registration with printing on the web 20. By the mechanical relations illustrated above, the die station of the present invention makes accurately placed cut slits into a travelling web. In one embodiment further described below each 360-degree rotation of the die wheel makes one slit cut into each package panel. In all cases the rotation of the die wheel is carefully regulated by a programmed controller.

Figure 7:
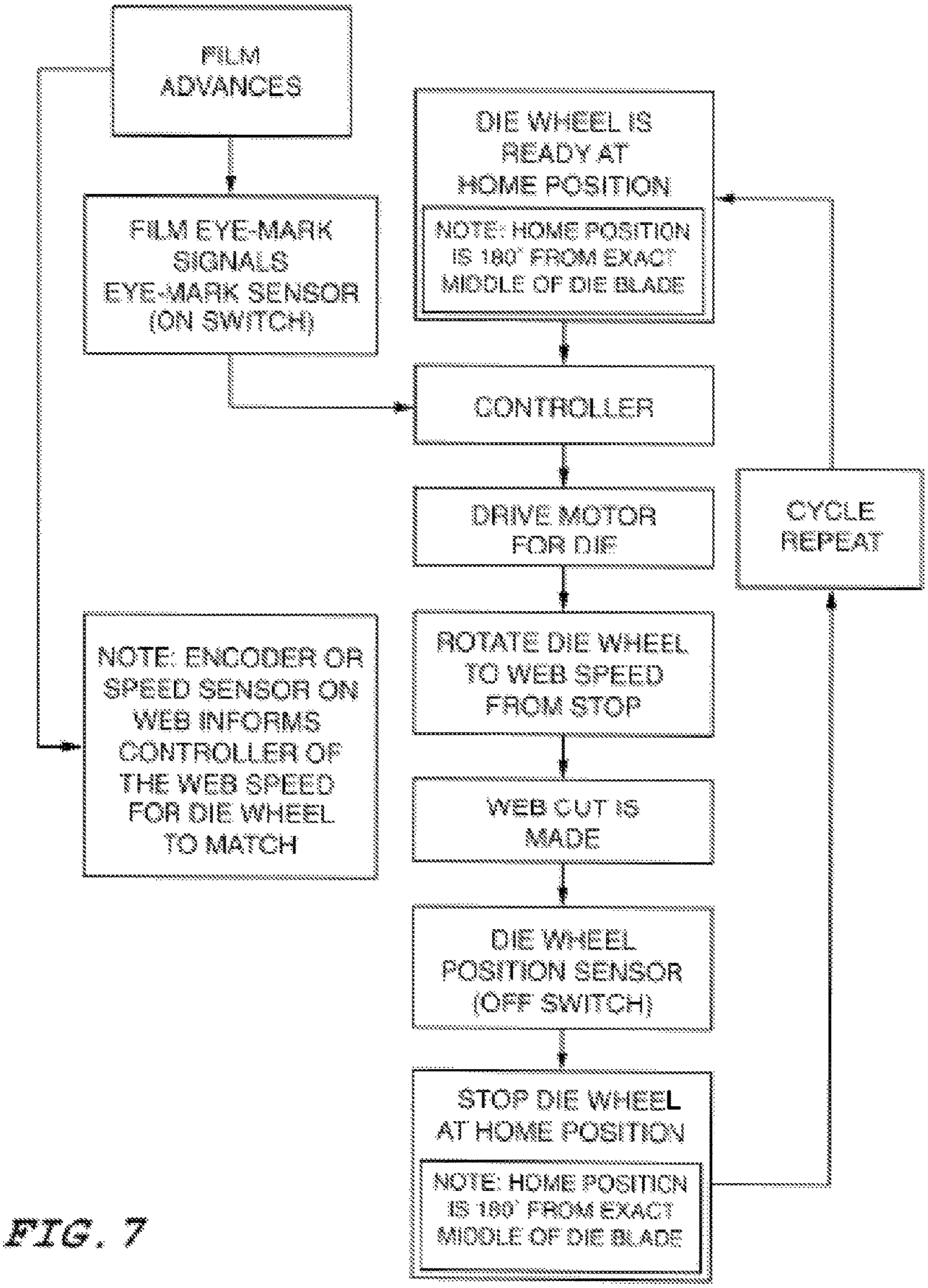
FIG. 7 is a flow chart showing an example operation of an example die station, according to one embodiment.

FIG. 7 illustrates a flow chart of the die station drive motor being programmed by a controller to operate intermittently. In this embodiment during the die wheel setup the cutting die 51 is magnetically affixed to the die wheel 22 having magnets 24 as seen in FIG. 3. At a point 180 degrees from the center of the cutting die a home position of the wheel is established by a sensor on the die wheel drive shaft. This marks a home, stopped position of the drive motor programming. Every 360 degrees of rotation of the drive wheel defines each operating cycle which is begun and ended at the home position. At the home position the web freely passes through the nip since the diameter of the wheel is smaller at this position providing an enlarged nip gap which allows the web to pass unaffected.

The initiation of each cycle from the home position is triggered by an eye mark sensor as seen in FIG. 1 which reads a position of the web upstream of the die station as it passes by. Leaving the home position, the motor accelerates the die wheel to match the linear web speed indicated by a web speed indicator which constantly monitors the web speed. With the web traveling through the cutting nip against the die blades, the web is cut into in the desired pattern of the die blade. A second position indicator on the drive shaft signals the position of the die wheel when the cut has been completed. At that point, the drive motor is signaled to decelerate and return to the stopped home position to complete the cycle and reset the process to begin again. Each cycle repeats from the home position to prevent error accumulation. It should be understood that the foregoing operating program is but one of many that may be employed. Other variations and adaptations are possible. For example, the orientation of the cut pattern need not necessarily be longitudinal but may be positioned laterally on the die wheel.

The foregoing represents various embodiments of the invention which are described for illustration only and is not intended to limit the invention to any particular embodiment. There may be variations and other modifications which nonetheless fall within the scope and spirit of the invention which is to be defined only by the following claims and their legal equivalents.

What is claimed is:

1. A web processing machine in a web production line, comprising:

a frame comprising:

a base, two vertical stanchions extending upwardly from and rigidly affixed to the base, and a cross-member rigidly affixed across top most ends of the two vertical stanchions;

a processing assembly comprising:

a yoke rigidly affixed to the cross-member and having opposing vertical side arms;

a process wheel located between and rotatably affixed to the opposing vertical side arms of the yoke, wherein the process wheel includes a first portion having processing features and a second portion, and wherein the first portion has a first diameter and the second portion has a second diameter that is less than the first diameter;

a drive motor connected to the process wheel; and an anvil roller located between and rotatably affixed to the two vertical stanchions at opposite ends, wherein the process wheel is in close proximity to the anvil roller and spaced apart by a nip having a gap configured to receive a traveling web of flexible material from the web production line such that the web is periodically acted upon by the processing features of the process wheel which intermittently contact the web as the web passes through the nip; and a motor controller programmed such that the drive motor provides intermittent rotary motion to the processing wheel, the motion of the process wheel defined by repeating 360-degree cycles of rotation, wherein the process wheel stops and starts during every cycle having a run period followed by a stop period that includes a stopped home position of the process wheel where the second portion of the process wheel is adjacent the anvil roller so that the web can pass through the nip without interference from the processing features, wherein the anvil roller is turned in correspondence with the speed of the web apart from the speed of the process wheel.

2. The web processing machine of claim 1, wherein the anvil roller is rotated in speed coordination with the process wheel.

3. The web processing machine of claim 1, wherein the drive motor is mounted to the frame and connected to the process wheel by a drive shaft.

4. The web processing machine of claim 3, wherein the drive shaft extends between and is rotatably supported by the two vertical stanchions.

5. The web processing machine of claim 1, wherein the processing features of the process wheel are cutting blades which pierce the web.

6. The web processing machine of claim 1, wherein every run period is initiated by a signal generated from a web sensor connected to the motor controller indicating a position of the web with respect to the rotational position of the process wheel without a change in the speed of the web.

7. The web processing machine of claim 6, wherein the web sensor is an eye mark sensor mounted adjacent the web.

8. The web processing machine of claim 6, wherein the sensor is an eye mark sensor mounted upstream of the processing assembly adjacent the web which reads a mark on the web as the mark passes by.

9. The web processing machine of claim 1, wherein the process wheel has magnets for affixing a cutting die having the processing features formed therein to the first portion of the process wheel by magnetism.

10. The web processing machine of claim 9, wherein the first portion of the process wheel has a circular perimeter which holds the cutting die and the second portion is non-circular.

11. The web processing machine of claim 1, wherein the anvil roller is supported by a lower support carriage affixed to the frame.

12. The web processing machine of claim 11, further comprising a positioning device for holding the lower support carriage in a selected lateral position on the frame.

13. The web processing machine of claim 12, wherein the positioning device is a screw rod threadably engaged with the lower carriage that is rotatably supported at opposite ends by the stanchions.

14. The web processing machine of claim 1, wherein the processing assembly is rigidly affixed to the cross-member by an upper carriage affixed to the cross-member.

15. The web processing machine of claim 14, further comprising a positioning device for holding the upper carriage in a selected lateral position on the frame.

16. The web processing machine of claim 15, wherein the positioning device comprises a screw rod threadably engaged with the upper carriage and rotatably supported at opposite ends by the stanchions.

17. The web processing machine of claim 1, wherein the cross-member includes laterally extending rails with laterally extending slots between the rails for receiving fastening device rigidly affixing the yoke to the cross-member.

18. The web processing machine of claim 1, wherein the processing assembly is a removable subassembly that includes removable stanchions that engage with the stanchions of the frame without structurally affecting an upper carriage, a lower carriage, the drive motor, or the anvil roller.

19. The web processing machine of claim 1, further comprising a nip gap adjustment device operative between the cross-member and the yoke for selectively positioning the process wheel either closer to or farther away from the anvil roller.

20. The web processing machine of claim 19, wherein the nip gap adjustment device includes an adjustment plate with screws which provide a force against the yoke.

21. The web processing machine of claim 20, wherein the yoke is pivotably affixed to an adjustment plate and the screws engage the opposing vertical side arms of the yoke.

22. The web processing machine of claim 1, wherein the home position of the process wheel is located where the center of the processing features is farthest from the nip.

23. The web processing machine of claim 1, wherein the machine is a die station, and the processing features on the first portion of the process wheel are blades for cutting into the web.

24. The web processing machine of claim 23, wherein the die station is located in a packaging line and the blades are configured to produce slits in the web for opening the package produced thereby.

25. The web processing machine of claim 24, wherein speed of the process wheel during the run period is matched to speed of the web such that the blades and the web pass through the nip at the same speed.

26. The web processing machine of claim 23, wherein the web is flexible packaging film.

27. The web processing machine of claim 23, further comprising a tape dispenser affixed to the frame and adapted to apply a length of adhesive tape over the web slits in the longitudinal direction.

28. A processing machine in a packaging line, comprising:

a frame supported by a base comprising:

a yoke rigidly affixed to the frame and having opposing vertical side arms; and a die wheel located between and rotatably affixed to the opposing vertical side arms of the yoke, wherein the die wheel includes a first portion with cutting blades and a second portion, and wherein the first portion has a first diameter and the second portion has a second diameter that is less than the first diameter;

a drive motor mounted to the frame and connected to the die wheel;

an anvil roller mounted to the frame in close proximity to the die wheel and spaced apart by a nip having a gap for receiving a constantly traveling web of flexible material from the packaging line such that the web is periodically cut into by the cutting blades of the die wheel as the web passes through the nip; and a motor controller programmed such that during a web processing run the drive motor drives intermittent rotation of the die wheel in repeating cycles, every 360 degrees of rotation of the die wheel defining a cycle, the die wheel motion during every cycle having a run period followed by a stop period at the same designated stopped home position of the die wheel where the web is released from contact with the die wheel cutting blades while the second portion of the die wheel is adjacent the anvil roller so that the web can pass beneath the die wheel without interference from the cutting blades, wherein the anvil roller is turned in correspondence with the speed of the web apart from the speed of the process wheel.

29. The processing machine of claim 28, wherein the beginning of the run period of every rotational cycle of the die wheel is initiated by a signal generated from an eye mark senor indicating a position of the web with respect to the rotational position of the die wheel.

* * * * *